Sheet 1, 4 Sheets.

O. S. Chapman.

Excavating Mach.

No. 4,038

Reissued Jun. 21, 1870

Witnesses:
Geo. I. Bergen
R. T. Dodge

Inventor:
O. S. Chapman
By Dodge & Munn
Attorneys

Sheet 2, 4 Sheets.
O. S. Chapman.
Excavating Mach.
No. 4,038. Reissued Jun. 21, 1870.
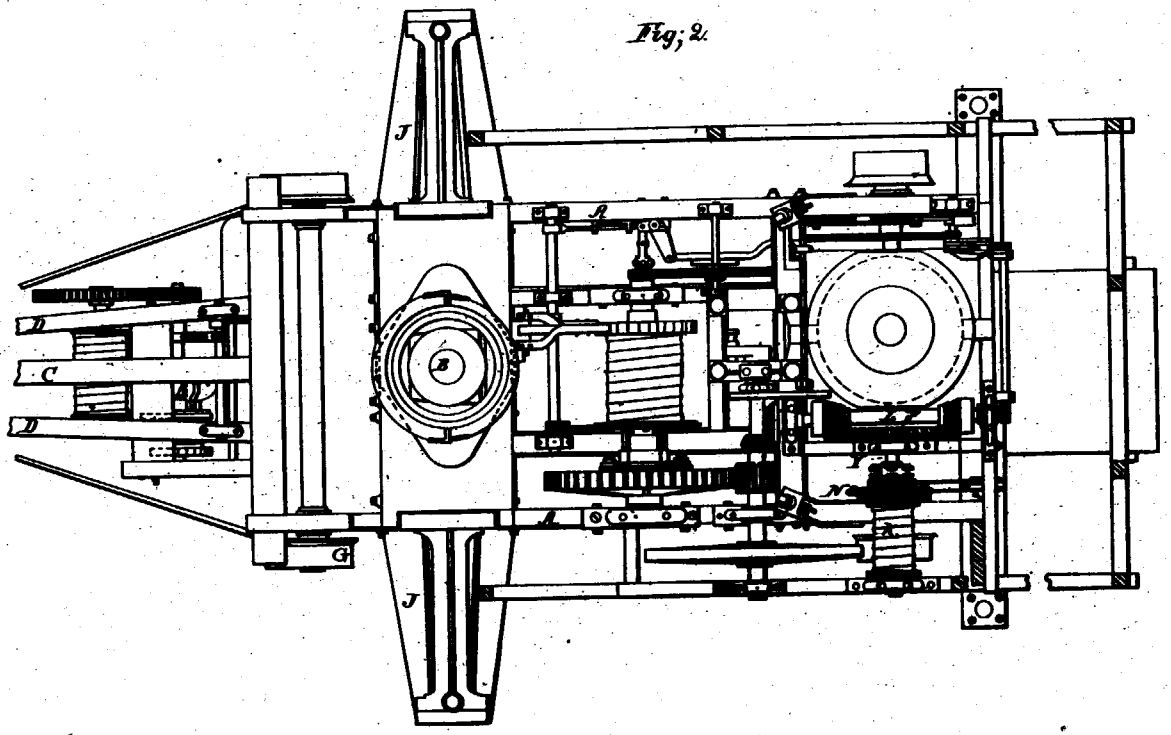
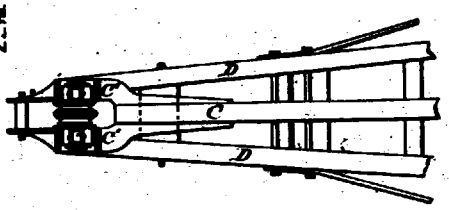
Witnesses;
Geo. S. Burgess
O. S. Dodge
Inventor;
O. S. Chapman
By Dodge & Munn
attorneys Sheet 3. 4 Sheets.
O. S. Chapman.
Excavating Mach.
No. 4,038. Reissued Jan. 21, 1870.
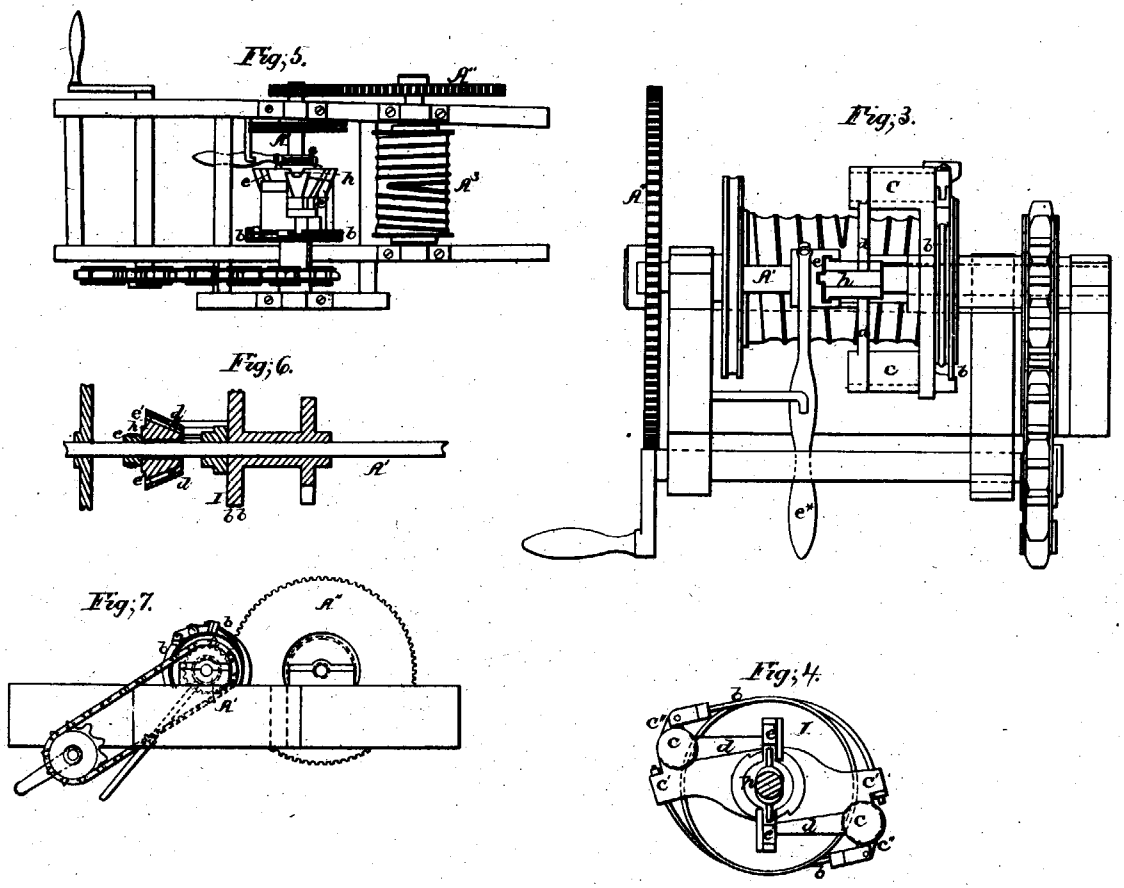
Witnesses:
Geo. S. Bergen
P. J. Dodge
Inventor,
O. S. Chapman
By Dodge & Munn
Attorneys

O. S. Chapman.
Excavating Mach.
No. 4,038. Reissued Jun. 21, 1870.
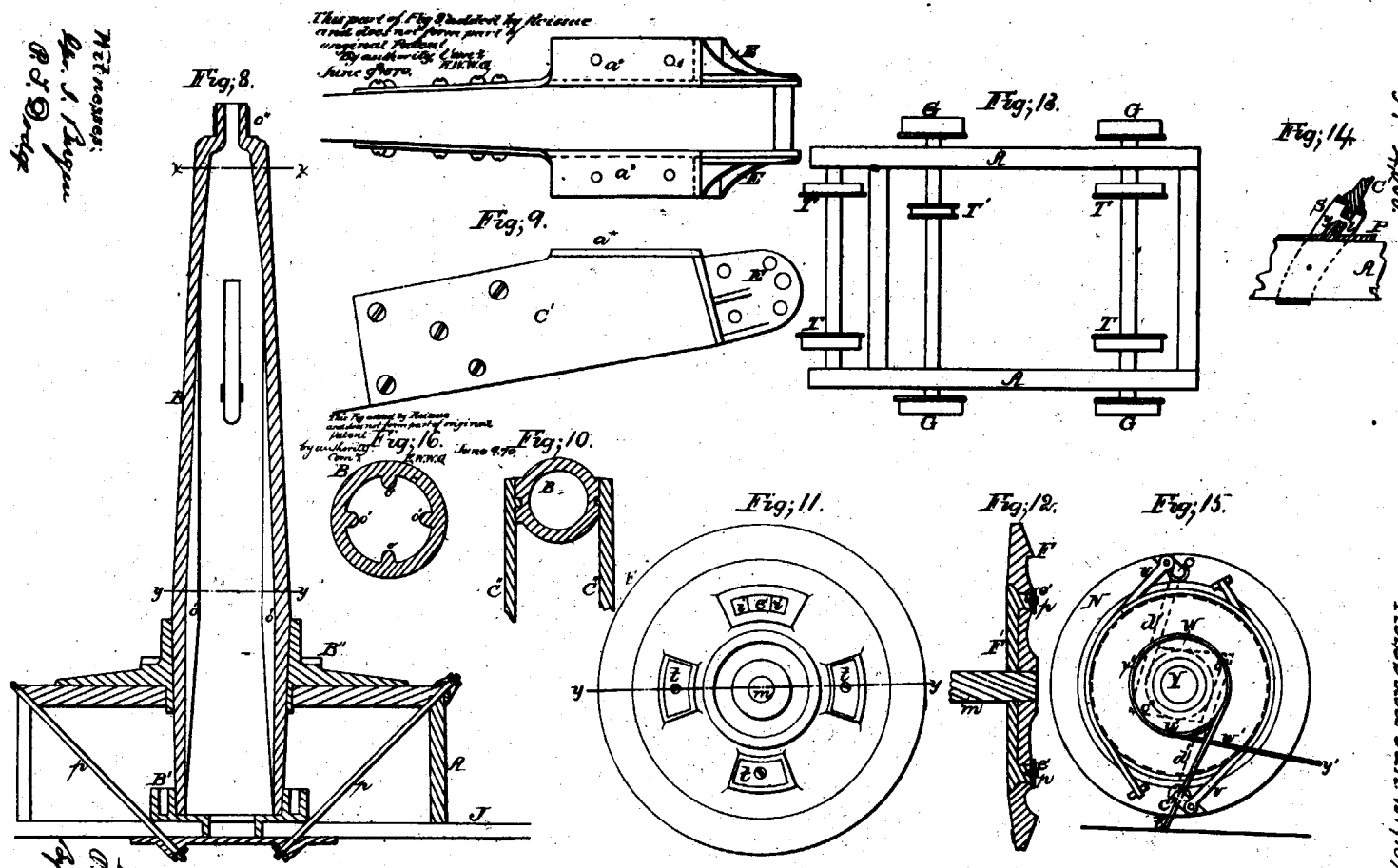
Witnesses:
Geo. S. Bergen
R. S. Dodge
Inventor:
O. S. Chapman
By Dodge & Munn
Attorneys

United States Patent Office.

OLIVER S. CHAPMAN, OF CANTON, MASSACHUSETTS.

*Letters Patent No.* 63,857, *dated April* 16, 1867; *reissue No.* 4,038, *dated June* 21. 1870

DIVISION A.

IMPROVEMENT IN EXCAVATING-MACHINES.

The Schedule referred to in these Letters Patent and making part of the same.

*To all whom it may concern:*

Be it known that I, OLIVER S. CHAPMAN, of Canton, in the county of Norfolk, and State of Massachusetts, have invented certain new and useful Improvements in Excavating-Machines; and I do hereby declare that the following is a full, clear, and exact description thereof, reference being had to the accompanying drawing making a part of this specification, and to the letters of reference marked thereon, like letters indicating like parts wherever they occur.

To enable others skilled in the art to construct and use my invention, I will proceed to describe it.

My invention consists in certain improvements in steam excavators, which said improvements are hereinafter described in detail.

Figure 2 is a top plan view, with a portion removed; and

Figure 1:
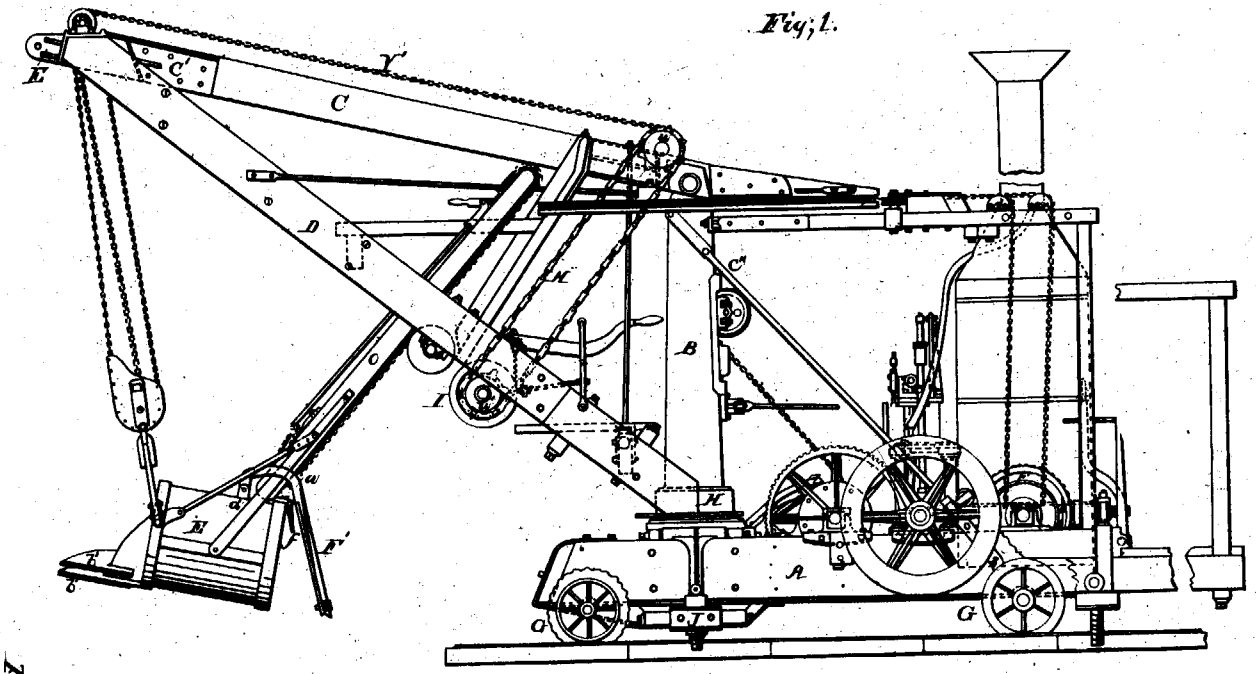
Figure 1 is a side elevation of the machine.

Figures 3, 4, 5, 6, 7, 9, 11, 12, 13, and 15 are views of portions shown in detail.

In its general plan and construction the machine is similar to those now in use, the construction of which is well known, and need not, therefore, be herein described. As heretofore constructed, these machines have been liable to frequent breakage and disarrangement, involving delays and heavy expenses.

My invention has for its object so perfecting the machine in its details as to obviate these difficulties, and, at the same time, render it much more perfect in its operation.

In figs. 1 and 2—

A represents the main frame, on which are mounted the machine and steam-engine for operating it.

B represents the main post upon which the crane that carries the shovel is mounted, this post not being more fully described here, as I intend making it the subject of a separate patent.

In fig. 2—

K is the drum on which is wound the chain that swings the crane to one or the other side, as may be necessary to bring the shovel to the required position, and this drum is operated by a gear-wheel, F.

As this must be put in motion at every movement of the crane, and has to be thrown in and out of gear with the bevel-gear on shaft L at each movement, it is obvious that the strain caused by the sudden throwing of it into gear so often will be very severe on the cogs, and have a tendency to break the said cogs.

To remedy this, I construct the wheel F as shown in figs. 11 and 12, the first being a front face view, and the latter a transverse section on the line *y y* of fig. 11.

The main portion of the wheel consists of a disk, having the cogs cut on its face or periphery according as it is intended to be a spur or bevel-gear, and having four or more oblong openings made through it, as in fig. 11, with a recess in its rear face to receive the disk F′, which is secured rigidly to the shaft *m*, the wheel F being loose on the shaft.

This disk F′ has on its face lugs *e′* which fit into the openings in wheel F in such manner as to leave a space on the two sides of the lugs *e′*, which spaces are filled with rubber or other elastic material, as represented by *i* in fig. 11.

A plate or cap, *t*, is then placed over the face of the opening and secured by a screw, as shown in fig. 12, which confines the rubber in place and firmly unites the two parts F and F′.

It will be readily seen that, when the wheel F is thrown suddenly into gear with another wheel which is in motion, the shock will expend itself, in a great measure, upon the rubber springs *i*, and thereby prevent the cogs from being broken.

It has been customary to construct the crane C with cast-iron plates at its outer end to receive and hold the end of the brace D, but these plates are liable to break when subjected to the heavy work which the machine is required to perform.

I construct the side-plates C′ of wrought iron, as shown in fig. 9, with a flange, *a**, at the top, and with strong cast-iron cheek-pieces, E, bolted securely at the outer end, thus forming a socket to receive and hold the upper end of the brace D, that will stand all the work and strain required of the machine.

The shovel E is made of metal, and it is provided with heavy steel prongs *b′*, which project at the front, as shown in fig. 1. These prongs are intended to prevent the shovel from injury when brought into contact with stones or other heavy objects, and also to hook under roots or rocks that cannot be readily seized hold of by the shovel itself.

It has a door, F″, hinged so as to open and permit the contents of the shovel to be emptied at its rear end when its front end is elevated.

In order to permit this door F″ to be raised far enough to be out of the way, and yet not strike against the bar O, it is suspended by the bent arms *a* and hinged, at *a′*, on the upper side of the shovel some distance in front of the rear end, as shown in fig. 1.

The door is so cut away on its upper side, in order not to hit the bar O when opened, that it is too narrow to cover the entire rear end of the shovel, and, to make up for this deficiency, I hinge a second and narrower door, *f*, to the upper rear end of the shovel, in such a manner that when the main or outer door is closed it will also shut over the inner door *f* and hold it closed.

Whenever the door F″ is opened, the door *f* is released and permited to swing free on its hinges, and by these means I am enabled to raise the shovel at its front end sufficiently to empty it of its contents almost instantly, and, at the same time, have the door F″ swing entirely out of the way.

For the purpose of having more complete control of the shovel, I have constructed a novel style of clutch for throwing the motive parts which operate the shovel in and out of operation, these parts being shown in figs. 3, 4, 5, 6, and 7.

As usual, the shovel is operated by a chain wound around a drum, $A^3$, driven by a gear-wheel, A″, which engages with a smaller wheel on shaft A′, on which latter is located the clutch, as shown in fig. 5.

This clutch consists of a disk, I, fig. 4, having grooves in its periphery to receive metal bands *b*, one end of which is secured to a projection, *c*′, by means of a nut, by which the band may be tightened or loosened at pleasure.

The bands, of which there are two, extend around the disk, and are attached, at their opposite ends, to the short arms *c*″ of a rock-shaft, *c*, as shown in figs. 4 and 7, there being longer arms, *d*, attached to the rock-shaft *c*, which arms project inward on opposite sides of the hub, *h*, shown in section in fig. 6, and in plan in fig. 3.

This hub *h* is connected to a collar, *e*, which slides loosely on shaft A′, the hub *h* being connected to the collar *e*, as shown in fig. 3, in such a manner that, while it is compelled to move with the collar longitudinally on the shaft A, it can move laterally independent of the collar *e*, the center of the hub *h* having an oblong hole cut in it for that purpose, as shown in fig. 4. The object of this lateral movement of the hub *h* on the shaft is to permit it to adjust itself to suit the position of the arms *d*, as they will vary according as one or the other of the belts *b* may be more or less tightened or loosened, and thus to bring the strain equally on both belts *b*.

A lever, *e**, is connected with the collar *e*, by which it is moved to and fro on the shaft A; and, as it is moved toward the disk I, the inclines *e*′, in the hub *h*, force the arms *d* outward, thereby drawing the bands *b* tight around the disk I.

By this construction and arrangement of the parts, the operator is enabled to control the operation or movement of the shovel in the most perfect manner, so that, in case the shovel comes in contact with a rock or any similar obstruction, it can be instantly released, and thus protected from injury; and, at the same time, by the use of the long arms *d* and the inclines for operating them, great power is obtained to tighten the bands *b*, and thereby give motion to the drum $A^3$.

On the shaft of the wheel at the rear of the crane, over which the chain Y′ passes, is mounted a sprocket-wheel, *w*, as shown in fig. 1, and on the shaft of wheel I, on which is mounted the clutch last named, is placed a similar sprocket-wheel, *w*′, and around these two sprocket-wheels passes an endless chain, H*. By these means, when the chain Y′ is set in motion, it communicates motion to the wheel I, and thereby to the drum around which passes the chain that operates the shovel, and as, by means of the clutch, the shovel may be made to operate with the wheel *w* or be thrown out of operation at pleasure, it is obvious that it can be controlled in its movements at the will of the operator.

As in moving the machine the track or foundation is at all times liable to be uneven, it is necessary to have on the shaft of the drum K a friction-wheel, arranged to be self-tightenipg, so that, if the machinery shall bind or not work freely, and more power be required to operate the drum K, it may be had by the operation of the clutch itself.

This clutch is represented by N in fig. 2, and its construction is shown in detail in fig. 15.

In this case the two metal bands are used working on the periphery of the wheel or disk N, the same as in the case of the clutch hereinbefore described, the bands *v* being secured at one end by a nut, so as to be adjusted, and the opposite ends being secured to the short arm of a rock-shaft, *c*, the same as in the former case.

The long arms *d*′ of these rock-shafts rest against the face of a square block, W, mounted on the same shaft Y on which the wheel or disk N is mounted, as shown in fig. 15.

It will be seen that, if the wheel N commences to slip on the shaft, the projecting corners of the block W, coming in contact with the arms *d*′, will press them outward, and thus cause the bands *v* to be drawn tighter and grip the wheel N with increasing force.

In order that the power thus applied may be uniform whichever way the shaft Y revolves, the projections *o**, which strike the arms *d*′ near their outward end, project further than the opposite corners, which strike the arms further in, the relative projection of these points being so proportioned that, whichever of them operates the arm *d*′, it will be moved the same distance, and, consequently, exert the same force on the bands *v*. By these means the clutch is made self-operating, and just in proportion as more power is required to operate the drum, from whatever cause, in that same proportion will the bands be tightened on the wheel N by the operation of the block W and the arms *d*′ of the rock-shafts *c*.

It should be understood that the bands *v* will be drawn sufficiently tight by means of the nut to hold the wheel in all ordinary cases, and that hence the self-tightening devices will only come into play when extra power is required, on account of the cramping or binding of the parts, as above described, or when the bands *v* may have become loosened.

The block W has attached to it a collar, *u*′, around which a band, *w*′, passes, as represented in fig. 15, one end of said band being secured to the frame of the machine at *t**, and the opposite end, *y*′, being secured to a lever operated by the foot of the attendant, so that, whenever desired, the attendant, by simply pressing on the lever, can tighten the rod and apply any desired force.

The machine thus constructed is mounted on car-wheels, G, as shown in plan in fig. 13, there being a pulley or wheel, T, secured to one of the axles, by which motion is imparted to the machine from the engine. These wheels G are placed outside of the main frame, and arranged to run on a track which is constructed in sections, so that, as fast as the machine is moved forward, a section of the track in the rear of the machine is taken up and laid in front of the same. Two or more of these wheels are provided with a radially-projecting flange, which is serrated or notched, as shown in fig. 1, to afford means of readily turning the wheels by levers, when it is desired to move it but a little distance, or the engine fails to move it.

Another set of car-wheels, T, is also provided, of larger diameter than the wheels G, and placed at proper distances apart to run on an ordinary railroad-track. These wheels T being of larger diameter than the wheels G, will so elevate the machine, when placed on a railroad-track, as to clear the wheels G from the rails and carry them over cross-tracks, &c., without hitting or touching any obstructions in the form of rails, ties, frogs, &c.

By these improvements, the machine, as a whole, is so perfected that it will work with rapidity and ease, and with far less liability to break or become deranged than any similar machine heretofore constructed. It is designed for use on railroads in excavating earth or gravel, and in loading it into cars, and also may be used as a dredge, the machine being placed on a scow or on a temporary track built on piles, according to the locality and kind of work to be performed.

I am aware that cars have been provided with wheels of different diameters to run on stationary tracks of different heights, in connection with a rack and pinion for ascending grades, and therefore I do not claim that; but

Having thus described my invention,

What I claim is—

1. The shovel E, provided with the doors F″ and *f*, arranged to operate as herein described.

2. The combination of the laterally-adjustable hub *h*, provided with the inclines *e′* and the rock-shafts *c*, for tightening the friction-bands *b*, substantially as and for the purposes set forth.

3. The combination of the bands *v*, rock-shafts *c*, provided with the arms or levers *d′*, and the block W, when arranged to operate as and for the purpose set forth.

4. Constructing the wheels with a notched flange, as represented in fig. 1, for the purpose herein set forth.

5. An excavating-machine, having its platform or supporting-frame provided with two sets of wheels, the one set for operation on the temporary track where the machine is to be used, and the other set, of larger diameter, for conveying the machine from place to place, on ordinary railways, substantially as described.

6. The compound gear-wheel, consisting of the movable portion F, having the slots therein, and the disk F′, with projections to fit into said slots, with the rubber or other yielding material interposed, the whole being arranged for joint operation, substantially as shown and described.

7. The combination of the clutch-wheel I, constructed and arranged as described, with the endless chain H* and sprocket-wheels *w* and *w′*, as set forth.

8. The combination of the wrought-iron plates C′, having the flanges *a** formed thereon, and the cast-iron check-pieces E bolted thereto, with the crane C, substantially as herein shown and described.

OLIVER S. CHAPMAN.

Witnesses:

PHIL. T. DODGE,

W. C. DODGE.